United States Patent [19]

Feneberg et al.

[11] 3,959,105

[45] May 25, 1976

[54] PROCESS FOR THE PRODUCTION OF HYDROPHILIC SURFACES ON SILICON ELASTOMER ARTICLES

[75] Inventors: Paul Feneberg, Planegg; Ulrich Krekeler, Munich, both of Germany

[73] Assignee: AGFA-Gevaert, A.G., Leverkusen, Germany

[22] Filed: Oct. 22, 1974

[21] Appl. No.: 517,096

Related U.S. Application Data

[63] Continuation-in-part of Ser. No. 318,853, Dec. 27, 1972.

[30] Foreign Application Priority Data

Oct. 25, 1973   Germany........................... 2353495

[52] U.S. Cl............................... 204/165; 204/164
[51] Int. Cl.$^2$.......................................... B01K 1/00
[58] Field of Search..................... 204/165, 168, 169

[56] References Cited

UNITED STATES PATENTS

| | | | |
|---|---|---|---|
| 2,935,418 | 5/1960 | Berthold et al. | 204/168 |
| 2,939,956 | 6/1960 | Parks | 250/324 |
| 3,183,152 | 5/1965 | Szekely et al. | 424/78 |
| 3,255,099 | 6/1966 | Wolinski | 204/169 |
| 3,333,032 | 7/1967 | Dickinson | 204/168 X |
| 3,376,208 | 4/1968 | Wood | 204/168 |
| 3,405,052 | 10/1968 | Schirmer | 250/531 |
| 3,503,859 | 3/1970 | Goncarovs et al. | 204/165 |
| 3,526,583 | 9/1970 | Hayward | 204/165 |
| 3,677,877 | 7/1972 | Metevia et al. | 204/165 X |

*Primary Examiner*—F. C. Edmundson
*Attorney, Agent, or Firm*—Michael J. Striker

[57] ABSTRACT

An article composed of a silicon elastomer and which includes activated silicon dioxide as a filler is subjected to ion bombardment. The nature and energy of the ions are such that certain regions of the outer silicone elastomer layers of the articles are destroyed while, at the same time, the silicon dioxide filler is exposed at these regions. The nature and energy of the ions are also such that the remaining regions of the outer silicon elastomer layers of the article are transformed into activated silicon dioxide. As a result, the surface of the article becomes hydrophilic. The effects achieved are due to rupture of the silicon-oxygen and/or silicon-carbon bonds of the silicon elastomer during the ion bombardment, that is, the kinetic energy of the ions is sufficient to break these bonds. The ions used are activated gas ions formed by gaseous discharge and the ions generally have a kinetic energy between 3 and 50 electron volts. Preferably, oxygen ions are utilized for the ion bombardment. The ion bombardment may be carried out in an atmosphere consisting essentially of oxygen or consisting essentially of oxygen and small amounts of water vapor. The pressure in the atmosphere may lie between $10^{-1}$ and $10^3$ torr. Improved results may be obtained when, subsequent to the ion bombardment, the article is contacted with water having a temperature in excess of 80°C, and particularly when the article is contacted with water vapor subsequent to the ion bombardment.

17 Claims, No Drawings

PROCESS FOR THE PRODUCTION OF HYDROPHILIC SURFACES ON SILICON ELASTOMER ARTICLES

CROSS REFERENCE TO RELATED APPLICATIONS

This application is a continuation-in-part of the copending application Ser. No. 318,853 filed Dec. 27, 1972.

BACKGROUND OF THE INVENTION

The invention relates generally to the production of hydrophilic articles. Of particular interest to the invention is a process for the production of hydrophilic surfaces on articles which contain a silicone elastomer.

In applicants' copending application Ser. No. 318,853 filed Dec. 27, 1972, it has been proposed to subject a silicone elastomer surface to glow discharge in an air or inert gas atmosphere having a pressure between $10^{-1}$ and $10^{-3}$ torr and, in this manner, to produce a hydrophilic surface.

However, it has been found that the hydrophilic surfaces obtained by this procedure are not entirely satisfactory. Thus, the hydrophilic surfaces are not completely stable and are not entirely resistant to hydrolytic influences.

SUMMARY OF THE INVENTION

Accordingly, it is a general object of the invention to provide a novel process for imparting hydrophilic characteristics to articles.

Another object of the invention is to provide a process for making the surfaces of articles which include a silicone elastomer hydrophilic and which process enables hydrophilic surfaces of greater stability than obtainable heretofore to be achieved.

A further object of the invention is to provide a process for making the surfaces of articles which include a silicone elastomer hydrophilic and which process enables hydrophilic surfaces to be obtained having a greater resistance to hydrolytic influences than could be achieved until now.

An additional object of the invention is to provide a process for making the surfaces of articles which include a silicone elastomer hydrophilic and which process is capable of imparting to the treated articles physiological compatibility of longer-lasting duration than was possible heretofore.

A concomitant object of the invention is to provide a novel article having a hydrophilic surface.

These objects, and others which will become apparent hereinafter, are achieved in accordance with the invention. One aspect of the invention resides in a process for the production of hydrophilic surfaces on articles which contain a silicone elastomer and which include silicon dioxide as a filler. In such a process, the invention provides for subjecting an article having a surface portion which comprises an outer layer of a silicone elastomer to the action of activated gas ions which are effective for causing the destruction of some regions of the outer layer and for causing exposure of the silicon dioxide filler of the article at these regions, and which activated ions are additionally effective for causing a transformation of at least part of the remainder of the outer layer to silicon dioxide.

Of particular interest to the invention is a process wherein the ions are formed and activated by gaseous discharge and, hence, the description herein will be primarily with reference thereto. Thus, according to this aspect of the invention, the surface portion of the article is subjected to the influence of gas ions which have been activated by a gaseous discharge.

DESCRIPTION OF THE PREFERRED EMBODIMENTS

The invention is applicable to articles of large dimensions as well as to articles of small dimensions. The articles treated in accordance with the invention may be shaped articles. A particular, although non-limiting, example of articles which may be subjected to the process of the invention is contact lenses.

In principle, any type of gas ions may be used for the process of the invention. However, it has been found that oxygen ions are particularly suitable for the process of the invention insofar as the physiological compatibility, as well as the stability and durability, of articles treated in accordance with the invention are concerned. For this reason, the invention will be described mainly with reference to the use of oxygen although this is not intended to limit the invention.

As indicated above, the article subjected to the action of the activated gas ions contains a silicone elastomer. The silicone elastomer generally includes silicon-oxygen (Si—O) and silicon-carbon (Si—C) bonds. In accordance with the invention, activated ions are used which have a kinetic energy equal to or greater than the energy of the silicon-oxygen or silicon-carbon bonds of the silicone elastomer. It is particularly advantageous, as will be discussed more fully below, for the activated ions to have an energy of approximately 3 to 50 electron volts.

According to the invention, the gaseous atmosphere in which the gaseous discharge is carried out is favorably an oxygen-containing atmosphere and, advantageously, an atmosphere consisting essentially of oxygen. In making contact lenses hydrophilic, for instance, the pressure during the gaseous discharge may be of the order of $10^{-1}$ torr. In the production of hydrophilic surfaces on larger objects, a gaseous discharge at atmospheric pressure ($10^3$ torr) may also be used.

In general, the gaseous discharge may be carried out at pressures between approximately $10^{-1}$ and $10^3$ torr. As a rule of thumb, a corona discharge, that is, a gaseous discharge at approximately atmospheric pressure, is used when a vacuum discharge, i.e., a gaseous discharge at a pressure lower than atmospheric pressure, is uneconomical. It may be mentioned here that, for contact lenses, the vacuum discharge is used almost exclusively by virtue of the better results obtained therewith.

The treating time, that is, the length of time for which the article is subjected to the action of the activated ions, is determined by the value of the product of the ionic density and the treating time. The value of this product is dependent upon the nature of the elastomer, and particularly upon the density of the filler material of the article. The value of this product may be determined experimentally and, thereafter, the treating time for a given ionic density may be readily calculated.

It has been found favorable for the oxygen atmosphere to contain a quantity of water vapor. In particular, it has been found advantageous for the oxygen atmosphere to contain traces of water vapor. However, the presence of water vapor in the atmosphere is not an absolute requirement for the process of the invention and the water vapor may be dispensed with.

In accordance with the invention, the silicone elastomer-containing article may be exposed to the influence of water after being subjected to the action of the activated ions. The article is preferably contacted with the water for a period of at least 12 hours. Advantageously, the water has a temperature of at least 80°C. Particularly good results are obtained when the silicone elastomer-containing article is exposed to influence of water vapor subsequent to being subjected to the action of the activated ions, that is, when the article is contacted with water in the form of water vapor. Although the reasons for this are not presently known, it has been found that the after-treatment with water yields better and more durable hydrophilic characteristics.

In order to provide a fuller understanding of the effects achieved in accordance with the invention, the invention will be further described with reference to the following exemplary illustration which, however, is not to be construed as limiting the invention:

Linear polymeric organopolysiloxane elastomer has the following structural formula:

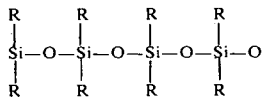

In the above formula, R represents an organic radical such as, for instance, the methyl radical -13 $CH_3$.

During cross-linking, the polymer chains are joined to one another by means of oxygen bridges, for instance. Thus, the final shaped article may be viewed as a single, giant molecule.

In order to obtain the desired mechanical properties, a filler material having a very large activated surface is mixed with the polymer, that is, a filler material is added to the polymer for the purpose of obtaining better mechanical properties. The surface of the filler material is activated for the purpose of working it into the polymer or elastomer. The filler material may, for example, be pyrogenically obtained silicon dioxide ($SiO_2$). This filler material may be prepared or unprepared. The details of the preparation, where a prepared filler material is used, do not form part of the invention per se. Generally, the filler material is prepared by the manufacturer of the silicone elastomer. For an example of the manner in which the filler material may be prepared, reference may be had to the German Pat. No. 1,699,974. In accordance with the invention, the filler material with an amount of 30–55% of the volume of polymer is advantageously in a prepared state in order to prevent penetration thereof in water. The finished product, that is, the mixture of polymer and filler material, is completely hydrophobic.

In order to make the surface thereof wettable, the silicone elastomer-containing product is bombarded with ions, for instance, oxygen ions. As a result, activated silicon dioxide ($SiO_2$) is formed in the region of the surface of the silicone elastomer-containing product as will become clearer below. This surface is not only hydrophilic but is also resistant to mechanical stress and a hydrolytic splitting.

It may be mentioned here that, where a prepared filler material is used, certain compounds may adhere to the surface of the filler material by virtue of the procedure utilized for the suitable preparation of the filler material. In addition to the effects outlined earlier, the ion bombardment also causes decomposition of these adherent compounds.

According to Pauli, the energy of the silicon-carbon (Si—C) bond is approximately 3 electron volts. Thus, in order to break this bond, the impact energy of the ions must have a corresponding magnitude. Such an impact energy may be achieved in a simple manner by a self-sustained or non-self-sustained gaseous discharge at a pressure below atmospheric pressure. However, by using a suitable field strength, the requisite impact energy may also be obtained at atmospheric pressure. Hence, the surface treatment in accordance with the invention has great technical practicality and is readily carried out.

The article is advantageously bombarded with negative oxygen ($O_2$) ions. The reason for this is that the natural charge distribution of silicon dioxide ($SiO_2$) corresponds to $Si^{++++}O^{--}O^{--}$. Consequently, it is advantageous to use D.C. voltage or potential for the gaseous discharge.

When the impact energy of the ions is equal to or greater than the energy of the silicon-oxygen (Si—O) or silicon-carbon (Si—C) bonds of the elastomer, these bonds are broken by the ions. It is preferred for the impact energy of the ions to be sufficiently great to break open both types of bonds. As a further result of the impacting action of the ions, the organic portions or radicals of the elastomer are knocked away from the elastomer. The organic portions of the elastomer which have been broken away therefrom are in gaseous phase. Thus, if the gaseous discharge is, for instance, a corona discharge at atmospheric pressure, the freed organic portions of the elastomer may simply volatilize in the surrounding atmosphere. On the other hand, if the gaseous discharge is carried out at a pressure below atmospheric pressure, the freed organic portions of the elastomer may volatilize as a gas in the existing vacuum and may then be withdrawn by suction.

By virtue of the silicon-oxygen (Si—O) and silicon-carbon (Si—C) bonds being broken open and the organic portions of the elastomer being broken away, only silicon (Si) and oxygen ($O_2$) still remain available as reaction components. Thus, a recombination to silicon dioxide ($SiO_2$) occurs. For the case of a broken silicon-oxygen (Si—O) bond, the recombination involves the addition of another oxygen ion or atom, i.e., another O. The effects which occur may be readily understood with reference to the structural formual for linear polymeric organopolysiloxane elastomer presented earlier.

The ion bombardment is favorably carried out using ionic energies of about 3 electron volts or more. In accordance with the invention, however, it is preferred that the ionic energies not exceed an upper limit of about 50 electron volts. In this energy range of about 3 to 50 electron volts, there is achieved a practical number of recombination to silicon dioxide ($SiO_2$).

The reason for preferably observing an upper limit of about 50 electron volts for the ionic energy resides in that the hydrophilic characteristics of the surface may worsen if higher impact energies are used. Thus, at higher energies, the inner structure of the silicone elastomer may also be destroyed or decomposed. However, the broken off portions of the silicone elastomer cannot escape from the interior of the latter. This has the result that the silicone elastomer takes on a brown color and becomes unusable.

By virtue of the procedure outlined above, the surface of the silicon dioxide ($SiO_2$) which is present in the polymer or elastomer as a filler material becomes exposed and the polymer or elastomer, e.g., organopolysiloxane, which is located between the regions where the silicon dioxide ($SiO_2$) filler is exposed is transformed to silicon dioxide ($SiO_2$). In other words, some regions of the outermost layers of elastmer are decomposed by the ion bombardment with a concomitant exposure of the silicon dioxide ($SiO_2$) filler at such regions. On the other hand, the remaining bombarded regions of the outermost layers are covered or transformed to silicon dioxide ($SiO_2$). It will be appreciated that, according to the invention, the natural hydrophilic characteristics of the silicon dioxide ($SiO_2$) filler material are utilized.

As has been discussed earlier, the article may be treated with water subsequent to the ion bombardment.

Silicone elastomer-containing articles treated in the manner described possess a durable hydrophilic surface which is resistant to hydrolytic splitting up of the silicon-oxygen (Si—O) bond. As an example, some portions of shaped articles were treated in accordance with the invention whereas the remaining portions were untreated. The articles were then boiled in water. After 5000 hours of boiling time, no noticeable worsening of the hydrophilic properties of the treated portions was observed whereas the untreated portions were opaque and exhibited traces of roughness.

The following Example is intented to further illustrate the manner of carrying out the process according to the invention for making articles hydrophilic. This Example is not, however, to be construed as limiting the invention.

EXAMPLE

A round disc having a thickness of 5 millimeters and a diameter of 20 millimeters contains organopolysiloxane elastomer which has been cross-linked with benzoyl peroxide. The disc is placed upon an electrically conducting carrier which is connected with a source of electrical current An electrically conducting plate, which is likewise connected with the source of electrical current, is positioned opposite the carrier. The carrier and the plate form the electrodes of a glow discharge arrangement and are arranged in a suitable vessel. The distance between the carrier and the plate is approximately 25 centimeters. In operation, the vessel is evacuated. After a pressure of about $10^{-2}$ torr has been reached, the vessel is purged with pure oxygen. Subsequently, the oxygen present in the vessel by virtue of the purging procedure is evacuated and pure oxygen is again admitted into the vessel until atmospheric pressure has been reached once more. Thereafter, the vessel is again evacuated and the pressure in the vessel is adjusted to approximately $10^{-1}$ torr. Upon the application of a potential, a glow is immediately obtained. The current density is about 1 milliampere per square centimeter and, after 2 minutes at this current density, the treatment is stopped. The thus-pretreated disc is then boiled for a period of 24 hours and is subsequently examined. The surface of the disc has good wettability and is resistant to mechanical stress such as is obtained, for instance, by rubbing with the fingertips for cleaning purposes. Medical experiments show that there is no reduction in physiological compatibility.

It will be understood that each of the elements described above, or two or more together, may also find a useful application in other types of processes and to articles differing from the type described above.

While the invention has been illustrated and described as embodied in a process for the production of hydrophilic surfaces on articles which contain a silicone elastomer and which include silicon dioxide as a filler, it is not intended to be limited to the details shown since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A process for the production of hydrophilic surfaces on articles which contain a silicone elastomer and which include silicon dioxide as a filler, comprising subjecting an article having a surface portion which comprises an outer layer of a silicone elastomer to the action of activated gas ions in an atmosphere consisting at least predominantly of oxygen, said gas ions impinging first regions of said outer layer and having an energy such that said outer layer is destroyed at said first regions and the silicon dioxide filler of said article is exposed at said first regions, and said gas ions also impinging second regions of said outer layer and having an energy such that said outer layer transforms to silicon dioxide at said second regions, whereby an improvement in the hydrophilic characteristics of said article is obtained due to the exposure of the silicon dioxide filler at said first regions and the transformation to silicon dioxide at said second regions.

2. A process as defined in claim 1, wherein said ions are formed and activated by gaseous discharge.

3. A process as defined in claim 1, wherein said ions comprise oxygen ions.

4. A process as defined in claim 1, said silicone elastomer of said article including a silicon-oxygen bond and a silicon-carbon bond; and wherein the kinetic energy of said ions is at least equal to the energy of one of said bonds.

5. A process as defined in claim 4, wherein said kinetic energy is between about 3 and 50 electron volts.

6. A process as defined in claim 1, wherein said activated gas ions are formed using a direct current potential source.

7. A process as defined in claim 1, wherein the pressure in said atmosphere is between about $10^{-1}$ and $10^3$ torr.

8. A process as defined in claim 7, wherein the pressure in said atmosphere is approximately $10^{-1}$ torr.

9. A process as defined in claim 7, wherein the pressure in said atmosphere is approximately $10^3$ torr.

10. A process as defined in claim 1, wherein said atmosphere consists essentially of oxygen.

11. A process as defined in claim 1, wherein said atmosphere comprises water vapor.

12. A process as defined in claim 1; and further comprising the step of contacting said surface portion with water subsequent to the step of subjecting said article to said action.

13. A process as defined in claim 12, wherein the contacting step is carried out for a period of at least twelve hours.

14. A process as defined in claim 12, wherein said water has a temperature of at least 80°C.

15. A process as defined in claim 14, wherein said water is in the form of water vapor.

16. A process as defined in claim 1, wherein said silicone elastomer of said article comprises an organopolysiloxane.

17. An article treated according to the process of claim 1.

* * * * *